United States Patent
Wang et al.

(10) Patent No.: US 11,074,188 B2
(45) Date of Patent: Jul. 27, 2021

(54) METHOD AND APPARATUS TO EFFICIENTLY TRACK LOCATIONS OF DIRTY CACHE LINES IN A CACHE IN A TWO-LEVEL MAIN MEMORY

(71) Applicant: Intel Corporation, Santa Clara, CA (US)

(72) Inventors: Zhe Wang, Portland, OR (US); Alaa R. Alameldeen, Hillsboro, OR (US); Lidia Warnes, Roseville, CA (US); Andy M. Rudoff, Boulder, CO (US); Muthukumar P. Swaminathan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/278,509

(22) Filed: Feb. 18, 2019

(65) Prior Publication Data
US 2019/0179764 A1 Jun. 13, 2019

(51) Int. Cl.
| G06F 12/08 | (2016.01) |
| G06F 12/0891 | (2016.01) |
| G06F 12/02 | (2006.01) |
| G06F 12/0893 | (2016.01) |

(52) U.S. Cl.
CPC ...... *G06F 12/0891* (2013.01); *G06F 12/0207* (2013.01); *G06F 12/0238* (2013.01); *G06F 12/0893* (2013.01)

(58) Field of Classification Search
CPC ............ G06F 12/0891; G06F 12/0893; G06F 12/0207; G06F 12/0238
USPC ...................................................... 711/135
See application file for complete search history.

(56) References Cited

U.S. PATENT DOCUMENTS

| 10,152,422 B1 | 12/2018 | Sampathkumar | |
| 2012/0317367 A1* | 12/2012 | Grayson | G06F 12/0804 711/143 |
| 2015/0026394 A1 | 1/2015 | Park et al. | |
| 2016/0246724 A1 | 8/2016 | Boehm et al. | |

FOREIGN PATENT DOCUMENTS

JP  2018014129 A  1/2018

OTHER PUBLICATIONS

Seshadri, et. al., "The Dirty-Block Index." In Proceeding of the 41st Annual International Symposium on Computer Architecture (ISCA '14). IEEE Press, Piscataway, NJ, USA, 157-168, 11 pages.
Sim et al, "A Mostly-Clean DRAM Cache for Effective Hit Speculation and Self-Balancing Dispatch," 2012 45th Annual IEEE/ACM International Symposium on Microarchitecture, Dec. 1-5, 2012, 11 pages.
Extended European Search Report for Patent Application No. 20152533.4, dated Jun. 25, 2020, 8 pages.

* cited by examiner

*Primary Examiner* — Hua J Song
(74) *Attorney, Agent, or Firm* — Compass IP Law, PC (57) ABSTRACT

A two-level main memory that includes a persistent memory and a cache is provided. Locations of dirty cache lines in the cache are tracked through the use a dirty cache line tracker. The dirty cache line tracker is stored in the cache and can be cached in a memory controller for the persistent memory. The dirty cache line tracker can be used to bypass cache lookup, perform efficient dirty cache line scrubbing and to decouple battery power and capacity of the cache in the two-level main memory.

20 Claims, 7 Drawing Sheets

METHOD AND APPARATUS TO EFFICIENTLY TRACK LOCATIONS OF DIRTY CACHE LINES IN A CACHE IN A TWO-LEVEL MAIN MEMORY

FIELD

This disclosure relates to a two-level main memory and in particular to cache management in the two-level main memory.

BACKGROUND

A two-level main memory can include a first level comprising a volatile memory and a second level comprising a persistent memory. The second level is presented as "main memory" to the host operating system while the first level is a cache for the second level that is transparent to the host operating system. The first level can be a direct-mapped cache with each cache line including data, metadata and Error Correction Code (ECC). The metadata can include a dirty bit, tag bits and state bits. If the minimum memory read granularity for the two-level memory is a cache line, the data, metadata and ECC are read to check the dirty bit for the cache line to determine if the cache line is clean or dirty.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

Reading an entire cache line to check one bit in the cache line wastes memory bandwidth and also consumes system power. Instead of reading the entire cache line to check the state of the dirty bit for the cache line in the first level of a two-level main memory, locations of dirty cache lines in the cache are tracked through the use a dirty cache line tracker. The dirty cache line tracker is stored in the first level memory of the two-level main memory and cached in the memory controller for the first level memory. The dirty cache line tracker can be used to bypass cache lookup, perform efficient dirty cache line scrubbing and to decouple battery power and capacity of the first level of the two-level main memory.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
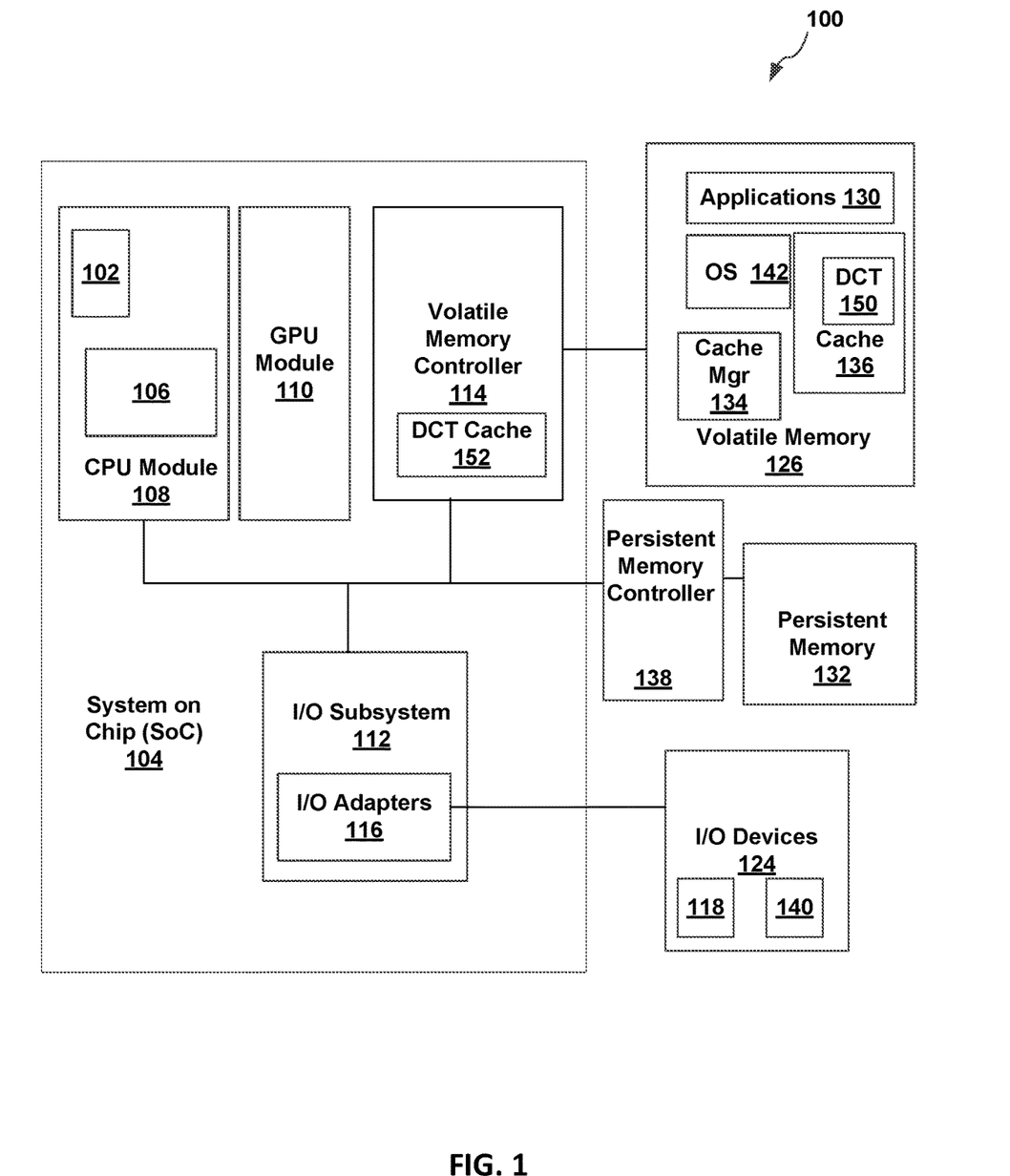
FIG. 1 is a block diagram of a computer system that includes a two-level main memory and a dirty cache line tracker to track locations of dirty cache lines in a cache (volatile memory) in the first level of the two-level main memory.

FIG. 1 is a block diagram of a computer system 100 that includes a two-level main memory and a dirty cache line tracker to track locations of dirty cache lines in a cache (volatile memory) in the first level of the two-level main memory. Computer system 100 can correspond to a computing device including, but not limited to, a server, a workstation computer, a desktop computer, a laptop computer, and/or a tablet computer.

The computer system 100 includes a system on chip (SOC or SoC) 104 which combines processor, graphics, memory, and Input/Output (I/O) control logic into one SoC package. The SoC 104 includes at least one Central Processing Unit (CPU) module 108, a volatile memory controller 114, and a Graphics Processor Unit (GPU) 110. In other embodiments, the volatile memory controller 114 can be external to the SoC 104. Although not shown, each of the processor core(s) 102 can internally include one or more instruction/data caches, execution units, prefetch buffers, instruction queues, branch address calculation units, instruction decoders, floating point units, retirement units, etc. The CPU module 108 can correspond to a single core or a two-core general purpose processor, such as those provided by Intel® Corporation, according to one embodiment. In other embodiments, the CPU module 108 can correspond to a multi-core or many-core processor with more than two cores.

The two-level main memory includes a cache 136 (first-level main memory that may also be referred to as "near" memory) in volatile memory 126 and persistent memory 132 (second-level main memory that may also be referred to as "far" memory). The cache 136 caches data stored in the persistent memory 132 in cache lines. If the data stored in a cache line in cache 136 has not been modified subsequent to being copied from the persistent memory 132, the cache line is clean. If the data stored in a cache line in cache 136 has been written subsequent to being copied from the persistent memory 132, the cache line is dirty. The persistent memory 132 is communicatively coupled to a persistent memory controller 138 that is communicatively coupled to the CPU module 108 in the SoC 104. The persistent memory 132 can be included on a memory module, for example a dual in-line memory module (DIMM) that can be referred to as a non-volatile dual in-line memory module (NVDIMM).

A dirty cache line tracker ("DCT") 150 in cache 136 in volatile memory 126 is used to track locations of dirty cache lines in the cache 136. A dirty cache line tracker cache 152 in the volatile memory controller 114 can be used to cache the dirty cache line tracker 150. In addition to cache 136, applications 130, an operating system (OS) 142, and a cache manager 134 can be stored in volatile memory 126.

The persistent memory 132 is a non-volatile memory. A non-volatile memory (NVM) device is a memory whose state is determinate even if power is interrupted to the device. A NVM device can comprise a block addressable memory device, such as NAND technologies, or more specifically, two-threshold level NAND flash memory (for example, Single-Level Cell ("SLC"), Two-Level Cell ("MLC"), Quad-Level Cell ("QLC"), Tri-Level Cell ("TLC"), or some other NAND). A NVM device can also include a byte-addressable write-in-place three dimensional cross point memory device, or other byte addressable write-in-place memory (also referred to as persistent memory), such as single or two-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The cache 136 is a volatile memory. Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The Graphics Processor Unit (GPU) 110 can include one or more GPU cores and a GPU cache which can store graphics related data for the GPU core. The GPU core can internally include one or more execution units and one or more instruction and data caches. Additionally, the Graphics Processor Unit (GPU) 110 can contain other graphics logic units that are not shown in FIG. 1, such as one or more vertex processing units, rasterization units, media processing units, and codecs.

Within the I/O subsystem 112, one or more I/O adapter(s) 116 are present to translate a host communication protocol utilized within the processor core(s) 102 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 116 can communicate with external I/O devices 124 which can include, for example, user interface device(s) including a display and/or a touch-screen display 140, printer, keypad, keyboard, communication logic, wired and/or wireless, storage device(s) 118 including hard disk drives ("HDD"), solid-state drives ("SSD") 118, removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (Non-Volatile Memory Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

An operating system (OS) 142 is software that manages computer hardware and software including memory allocation and access to I/O devices. Examples of operating systems include Microsoft® Windows®, Linux®, iOS® and Android®.

Figure 2:
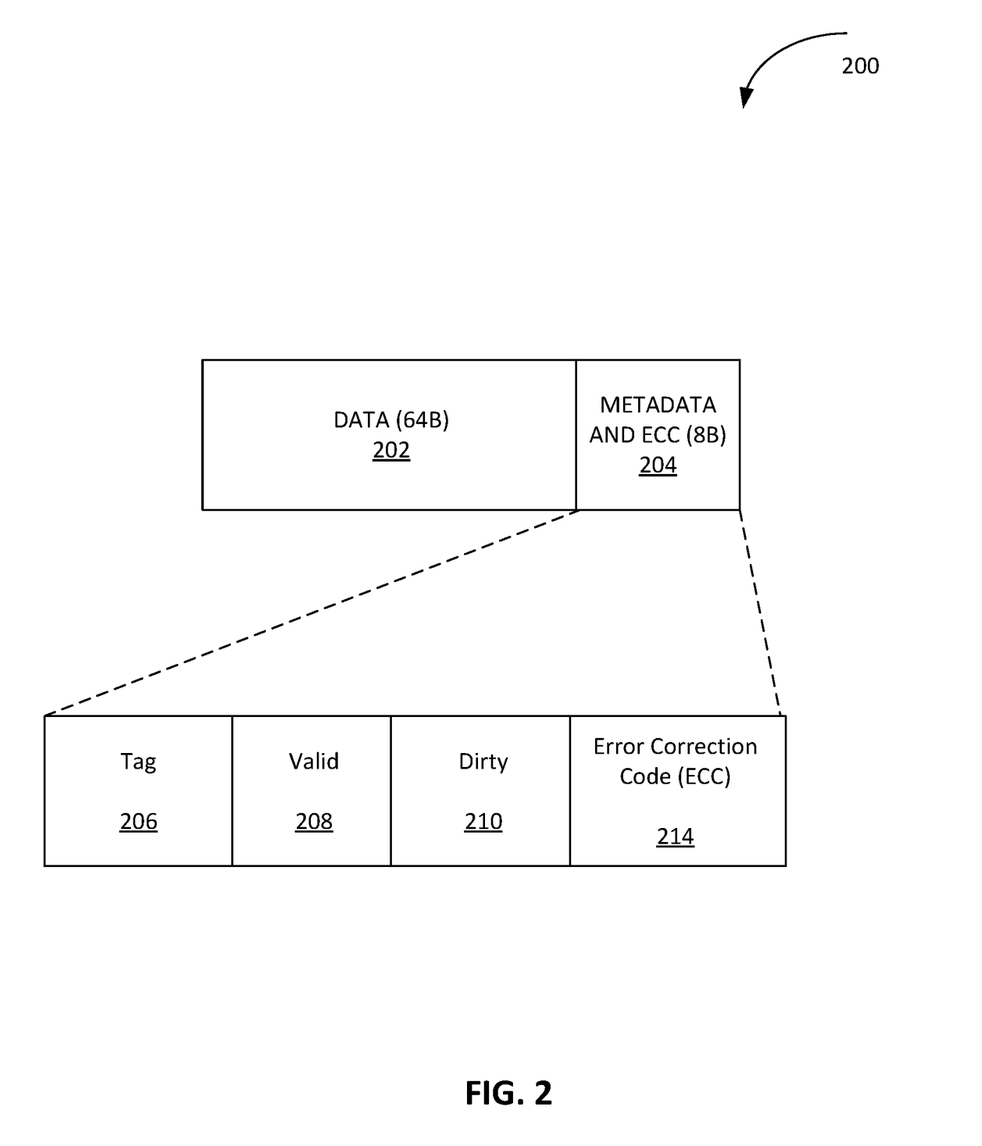
FIG. 2 is a conceptual view of a cache line in the first level main memory of the two-level main memory shown in FIG. 1.

FIG. 2 is a conceptual view of a cache line in the cache 136 of the two-level main memory shown in FIG. 1. The cache 136 can be coupled to the SoC 104 via high bandwidth, low latency means for efficient processing. The persistent memory 132 of the two-level main memory can be coupled to the SoC 104 via low bandwidth, high latency means (as compared to that of cache136).

In an embodiment, the cache 132 is a Synchronous Dynamic Random Access Memory (for example, JEDEC DDR SDRAM) and the persistent memory 132 is a three dimensional cross point memory device (for example, Intel® 3D XPoint™ technology). The cache 136 (first level memory of the two-level main memory) is organized as a direct-mapped cache. Data is transferred between the persistent memory 132 (second level of the two-level main memory) and the cache 136 in blocks of fixed size, called cache lines or cache blocks. A cache line 200 includes data 202 and metadata and Error Correction Code (ECC) 204. The metadata and Error Correction Code (ECC) 204 includes ECC 214, tag 206, valid bit 208 and dirty bit 210. When data is copied from persistent memory 132 into a cache line in the cache 136, the requested memory location (address of the data stored in the persistent memory 132) is stored in a tag field 206 and the data is stored in a data field 202 in the cache line 200.

In an embodiment, the cache 136 includes nine memory chips with data for the cache line stored across eight of the eight memory chips and metadata and ECC for the cache line stored in one of the nine memory chips. The nine memory chips may be on a Dual Inline Memory Module (DIMM). Each cache line (which may also be referred to as a cache block) is 64 Bytes, with each of the eight memory chips to store 8 Bytes of the 64 Byte cache line. Each 64 Byte cache line has 8 Bytes of metadata and ECC. The tag 206 and metadata for each cache block, including the dirty bit 210, are stored in the ECC chip as shown in FIG. 2.

Figure 3A:
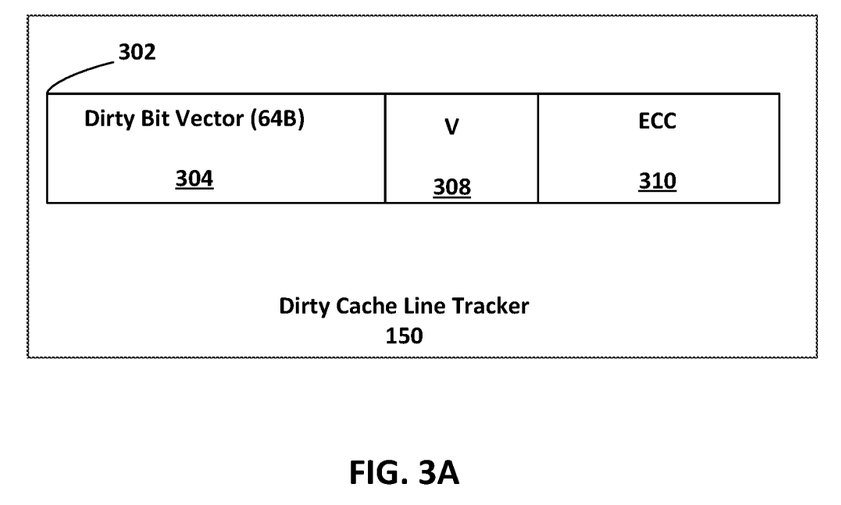
FIG. 3A is a block diagram illustrating an embodiment of a dirty cache line tracker to track dirty cache lines in the cache (first level main memory of the two-level main memory) shown in FIG. 1.

FIG. 3A is a block diagram illustrating an embodiment of a dirty cache line tracker 150 to track dirty cache lines in the cache 136 (first level main memory of the two-level main memory) shown in FIG. 1.

The dirty cache line tracker 150 includes a plurality of dirty cache line entries 302 to quickly and efficiently track locations of dirty cache lines 200 in the cache 136. As discussed in conjunction with FIG. 1, the dirty cache line tracker 150 is stored in cache 136.

Figure 3B:
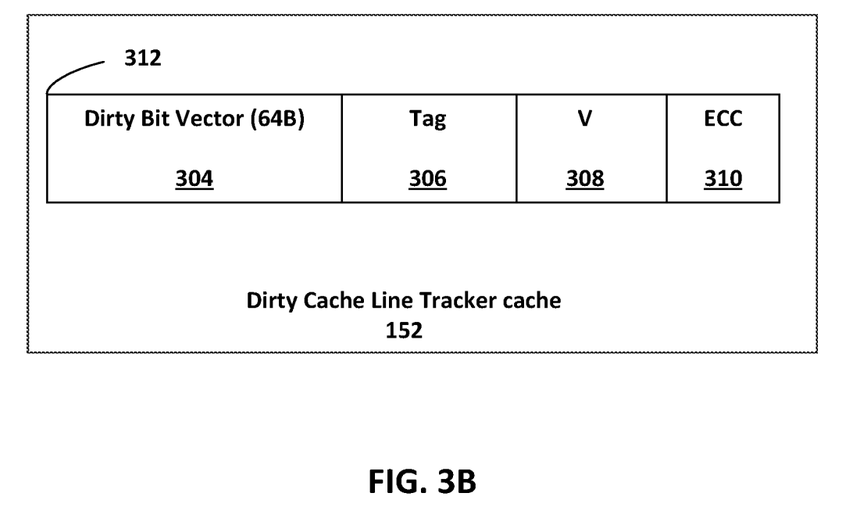
FIG. 3B is a block diagram illustrating an embodiment of a dirty cache line tracker cache in the volatile memory controller.

FIG. 3B is a block diagram illustrating an embodiment of a dirty cache line tracker cache 152 in the volatile memory controller 114. The dirty cache line tracker cache 152 includes a plurality of dirty cache line tracker entries 312.

Figure 4:
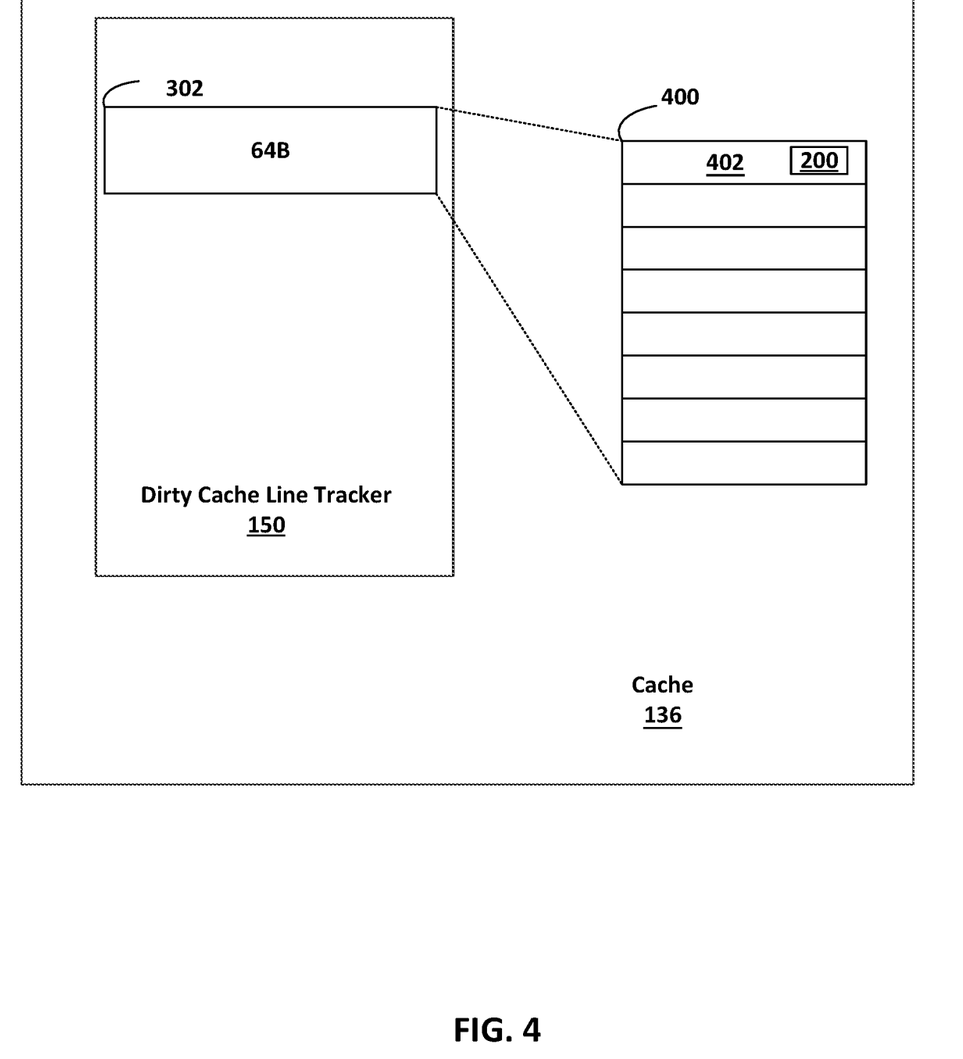
FIG. 4 is a block diagram illustrating the relationship between the dirty cache line tracker and cache lines in the cache.

FIG. 4 is a block diagram illustrating the relationship between the dirty cache line tracker 300 and cache lines 200 in the cache 136. In an embodiment, each dirty cache line entry 302 in the dirty cache line tracker 150 can store 512 dirty bits, each of the 512 dirty bits corresponds to one of 512 consecutive cache lines 200 in cache 136. There is one dirty cache line entry for 8 consecutive rows 400 in the cache 150, with each cache row 402 in the consecutive rows 400 having 64 cache lines 200. The dirty cache line entry 302 includes a dirty bit vector 304, a valid (V) bit 306 and ECC 310. The state of the valid bit 306 indicates whether the data stored in the dirty bit vector 304 is valid. Each bit in the dirty bit vector 304 corresponds to one of the cache lines 200 in the eight consecutive cache rows 400 in the cache 136. The state of the dirty bit in the dirty bit vector 304 indicates whether the corresponding cache line 200 in the cache 136 is dirty or clean.

In an embodiment, the dirty cache line tracker 150 is a Static Random Access Memory (SRAM). Each time the state of a dirty bit in the dirty bit vector 304 is changed to indicate that the corresponding cache line is dirty (either from a logic '1' to a logic '0' or a logic '0' to a logic '1'), that is, when data is written to the cache line 200 in the cache 136, the corresponding dirty bit in the dirty bit vector 304 in the dirty cache line tracker 150 is updated to reflect the change. In an embodiment, the dirty cache line tracker 150 in cache 136 is cached in the dirty cache line tracker cache 152 in the volatile memory controller 114. The dirty cache line tracker entry 312 in the dirty cache line tracker cache 152 includes a dirty bit vector 304, a valid (V) bit 306, a tag 308 and ECC 310. The tag 308 stores the first row address in the consecutive rows of cache 136 corresponding to dirty bits in the dirty bit vector 304.

In an embodiment in which the cache 136 is 512 Giga Bytes (GB), 1 GB of the 512 GB is allocated for the dirty cache line tracker 150 (that is, 0.02% of the cache 136). A dirty bit in the dirty bit vector 304 in a dirty cache line entry 302 in the dirty cache line tracker 150 indicates whether the cache line 200 in the corresponding row 402 is dirty. The dirty cache line entry 302 is cached in the dirty bit tracker cache 152 in the volatile memory controller 114. In an embodiment, the dirty bit tracker cache 152 is a set-associative cache.

Figure 5:
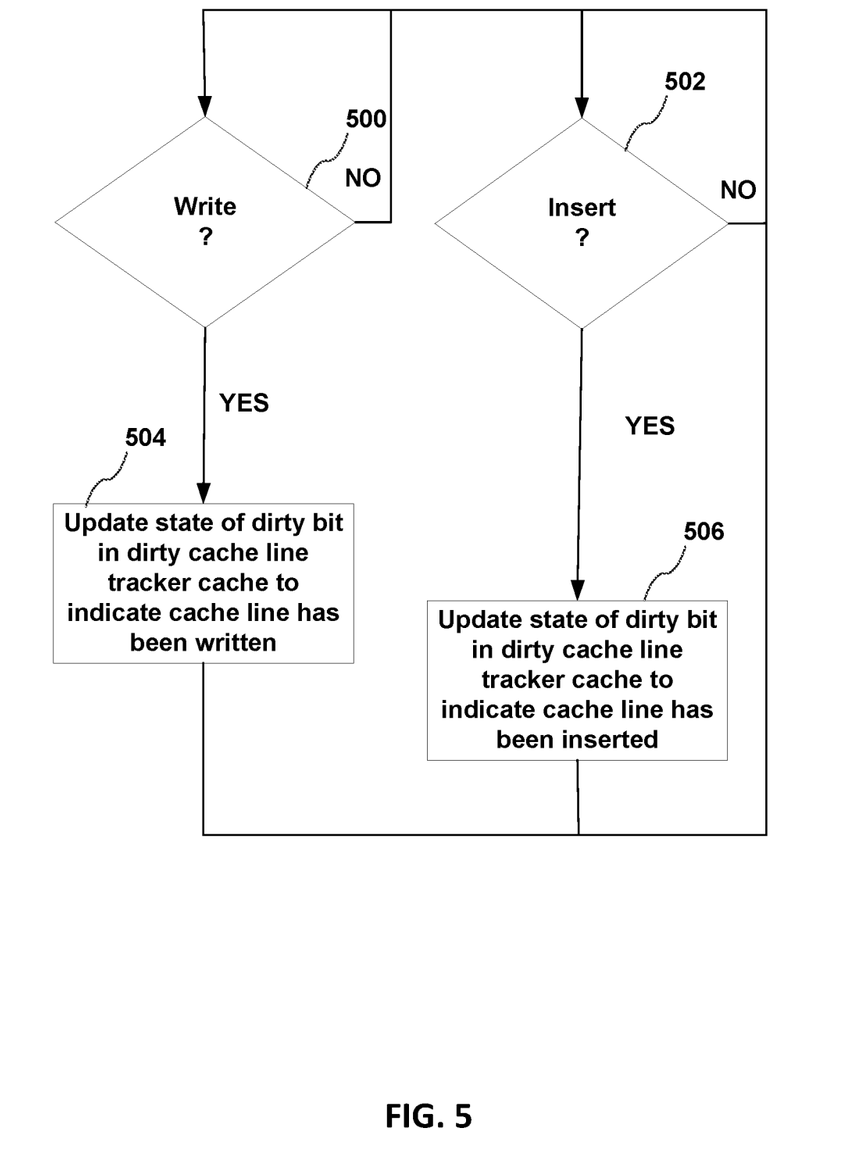
FIG. 5 is a flowgraph illustrating the use of the dirty cache line tracker to bypass lookup of dirty bits in cache lines in the cache.

In an embodiment, in which 0.02% of the cache 136 is allocated for the dirty cache line tracker 150, the data in persistent memory 132 that maps to the dirty cache line tracker 150 is remapped to other locations in the cache 136 by changing the state of the most significant bit in the tag 308. FIG. 5 is a flowgraph illustrating the use of the dirty cache line tracker to bypass lookup of dirty bits in cache lines in the cache 136.

At block 500, if a write request is received, processing continues with block 502.

At block 502, if an insert request is received processing continues with block 504.

At block 504, the dirty cache line entry 302 in the dirty bit tracker cache 152 in the volatile memory controller 114 is read to determine the state of the dirty bit associated with the cache line 200 to be written. When data is written to a cache line 200 in cache 136 in which the dirty bit 210 is logical '0' indicating that the cache line is clean, that is, has not been modified (written) after being copied from persistent memory 132, the dirty bit 210 of the corresponding cache line 200 block is changed from a logical '0' (clean) to a logical '1' (dirty). After the data is written to the cache line 200, if the dirty bit associated with the cache line is in a dirty cache line entry 302 in the dirty bit tracker cache 152, the dirty bit is changed from a logical '0' (clean) to a logical '1' (dirty). If not, the dirty cache line entry 302 is fetched from the dirty cache line tracker 150, inserted in the dirty bit tracker cache 152 and the dirty bit is changed from a logical '0' (clean) to a logical '1' (dirty).

At block 506, in response to the request to insert a cache line in the cache 136, a dirty cache line in the cache is selected for eviction from the cache 136. The dirty cache line tracker cache 152 is accessed to select the dirty cache line based on the state of dirty bits stored in the dirty cache line tracker cache 152. The modified data stored in the dirty cache line is written back to persistent memory 132 and the dirty bit 210 of the corresponding cache line 200 is changed from a logical '1' (dirty) to a logical '0' (clean) and the dirty bit in the dirty cache line tracker cache 152 corresponding the evicted cache line 200 is changed from a logical '1' (dirty) to a logical '0' (clean).

Figure 6:
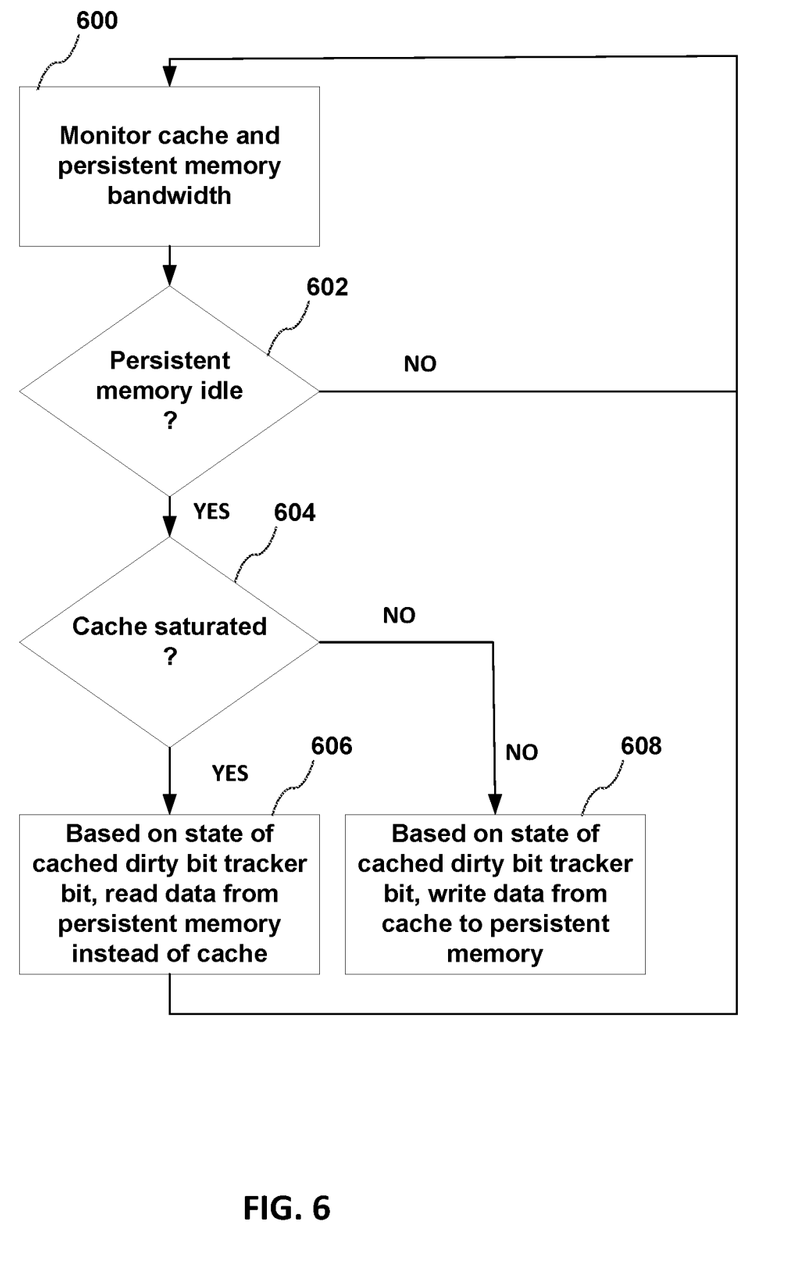
FIG. 6 is a flowgraph illustrating use of the cached dirty cache line tracker improve bandwidth utilization in the two-level memory.

FIG. 6 is a flowgraph illustrating use of the cached dirty cache line tracker 152 improve bandwidth utilization in the two-level memory.

At block 600, the persistent memory and cache bandwidth utilization is monitored. In an embodiment, bandwidth utilization is monitored by counting the number of requests in the read queue and the write queue. The overall bandwidth utilization of the two-level memory can be improved if both the persistent memory and the cache memory bandwidth can be efficiently exploited.

At block 602, the persistent memory is idle if there are no requests in the read queue and write queue. If the persistent memory is idle, processing continues with block 604. If not, processing continues with block 600.

At block 604, if the cache is bandwidth-saturated and the persistent memory is idle, processing continues with block 606. If the cache is not bandwidth-saturated and the persistent memory is idle, processing continues with block 608.

At block 606, the cache is bandwidth-saturated and the persistent memory is idle, a request to read the cache can be redirected from the volatile memory controller 114 to the persistent memory controller 138 to the persistent memory 132 for service dependent on the state of the dirty bit associated with the cache line in which the data is stored in cache. It can be easily determined from the state of the dirty bit in the dirty cache line tracker cache, if the read request to the cache is for unmodified data stored in the cache and can be serviced by the persistent memory. Only a request to read data stored in a cache line in the cache in which the dirty bit is '0' (which may be referred to as a "clean data request") can be redirected to persistent memory. If the request is to read data stored in a cache line in the cache in which the dirty bit is '1' (which may be referred to as a "dirty data request"), the access cannot be redirected to persistent memory because the data stored in the persistent data is stale data.

At block 608, while the persistent memory is idle and the cache is not saturated, modified data in cache lines in cache can be written back to persistent memory. The cache lines storing modified data (also referred to as "stale data") to be written back to persistent memory can be easily determined from the state of the dirty bits in the dirty cache line tracker cache. Writing the modified data (also referred to as "dirty cache lines" or "dirty blocks) while the persistent memory is idle reduces the time to evict cache lines in the cache because stale data has already been written back to persistent memory.

Figure 7:
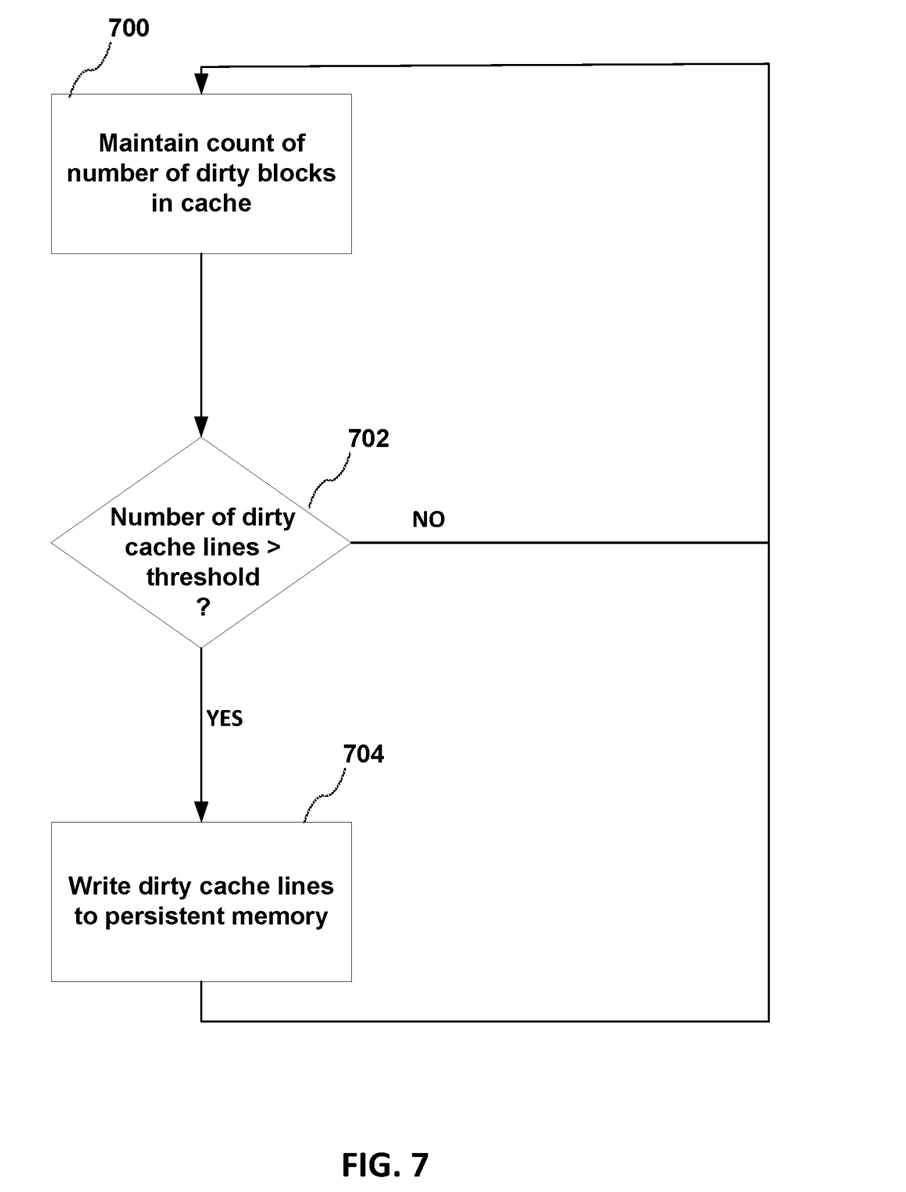
FIG. 7 is a flowgraph illustrating the use of the cached dirty cache line tracker to reduce battery capacity in a system with a two-level memory.

FIG. 7 is a flowgraph illustrating the use of the dirty cache line tracker cache152 to reduce battery capacity in a system with a two-level memory.

The cache 136 is a volatile memory and can include battery-backed Dynamic Random Access Memory (DRAM). "Battery capacity" (a measure of charge stored by a battery) is selected to ensure that all data in the cache 136 can be flushed to the persistent memory 132 in the event of loss of power to the system. Without any optimization, the battery capacity needs to ensure that the system can operate after a power loss event, for a sufficient time period to write all of the data stored in cache 136 to the persistent memory 132.

At block 700, a count of dirty blocks is maintained in the system to track the number of cache lines in the cache 136 that are dirty. In a system that includes a battery with a fixed capacity, the number of dirty cache lines that can be written back to the persistent memory 132 while power is provided to the system by the battery represents a threshold (or the dirty cache line budget) for the number of cache lines that can be modified at any point in time.

At block 702, if the number of dirty cache lines in cache 136 is greater than the dirty cache line budget, processing continues with block 704.

At block 704, the data stored in dirty cache lines in the cache are written back to persistent memory 132 until the count of dirty blocks is below the dirty cache line budget.

In a two-level main memory that uses the dirty cache line tracker 150 to track dirty cache lines in the cache 136, in one embodiment the battery capacity only needs to ensure that 25% of the cache content can be flushed to the persistent memory 132 after the power failure. This significantly reduces the battery cost (based on battery capacity) for the two-level main memory.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

What is claimed is:

1. An apparatus comprising:
    a two-level main memory, the two-level main memory comprising:
        a persistent memory; and
        a volatile memory, the persistent memory communicatively coupled to a persistent memory controller, the volatile memory communicatively coupled to a volatile memory controller, the volatile memory including:
            a cache, the cache including a plurality of cache lines, each cache line to store a copy of data read from the persistent memory;
            a dirty cache line tracker, the dirty cache line tracker to store a plurality of dirty cache line entries, each dirty cache line entry to store N dirty bits, each dirty bit corresponding to one of N consecutive cache lines in one of M consecutive rows in the cache, each row including N/M cache lines; and
            a cache manager to read the N dirty bits in a dirty cache line entry to identify a location of a dirty cache line in the cache.

2. The apparatus of claim 1, wherein the cache manager to write the dirty cache line associated with the dirty bit in the dirty cache line entry to the persistent memory.

3. The apparatus of claim 1, wherein the cache manager to monitor a number of dirty lines in the dirty cache line tracker and to write dirty cache lines to the persistent memory while the number of dirty lines is greater than a threshold number of dirty lines.

4. The apparatus of claim 1:
wherein the volatile memory controller including a dirty cache line tracker cache, the dirty cache line tracker cache to store a copy of dirty cache line entries stored in the dirty cache line tracker.

5. The apparatus of claim 4, wherein the volatile memory controller to write data directly to a persistent memory address if cache is saturated and a dirty bit corresponding to a cache line associated with the persistent memory address indicates the cache line is clean.

6. The apparatus of claim 1, wherein the persistent memory is a byte addressable write-in-place non-volatile memory.

7. The apparatus of claim 1, wherein the volatile memory is a dynamic random access memory.

8. A method comprising:
storing in a cache, a copy of data read from a persistent memory in a two-level main memory, the two-level main memory comprising the persistent memory and a volatile memory comprising the cache, the persistent memory communicatively coupled to a persistent memory controller, the volatile memory communicatively coupled to a volatile memory controller, the cache including a plurality of cache lines, each cache line to store a copy of data read from the persistent memory;
storing a plurality of dirty cache line entries in a dirty cache line tracker, each dirty cache line entry to store N dirty bits, each dirty bit corresponding to one of N consecutive cache lines in one of M consecutive rows in the cache, each row including N/M cache lines; and
reading, by a cache manager, the N dirty bits in a dirty cache line entry to identify a location of a dirty cache line in the cache.

9. The method of claim 8, wherein the cache manager to write the dirty cache line associated with the dirty bit in the dirty cache line entry to the persistent memory.

10. The method of claim 8, wherein the cache manager to monitor a number of dirty lines in the dirty cache line tracker and to write dirty cache lines to the persistent memory while the number of dirty lines is greater than a threshold number of dirty lines.

11. The method of claim 8, further comprising:
storing, by the volatile memory controller, a copy of dirty cache line entries stored in the dirty cache line tracker in a dirty cache line tracker cache in the volatile memory controller.

12. The method of claim 11, further comprising:
writing, by the volatile memory controller, data directly to a persistent memory address if the cache is saturated and a dirty bit corresponding to a cache line associated with the persistent memory address indicates the cache line is clean.

13. The method of claim 11, wherein the persistent memory is a byte addressable write-in-place non-volatile three dimensional cross point memory.

14. The method of claim 13, wherein the volatile memory is a dynamic random access memory.

15. A system comprising:
a processor; and
a two-level main memory communicatively coupled to the processor, the two-level main memory comprising:
a persistent memory; and
a volatile memory, the persistent memory communicatively coupled to a persistent memory controller, the volatile memory communicatively coupled to a volatile memory controller, the volatile memory including:
a cache, the cache including a plurality of cache lines, each cache line to store a copy of data read from the persistent memory;
a dirty cache line tracker, the dirty cache line tracker to store a plurality of dirty cache line entries, each dirty cache line entry to store N dirty bits, each dirty bit corresponding to one of N consecutive cache lines in one of M consecutive rows in the cache, each row including N/M cache lines; and
a cache manager to read the N dirty bits in a dirty cache line entry to identify a location of a dirty cache line in the cache.

16. The system of claim 15, wherein the cache manager to write the dirty cache line associated with the dirty bit in the dirty cache line entry to the persistent memory.

17. The system of claim 15, wherein the cache manager to monitor a number of dirty lines in the dirty cache line tracker and to write dirty cache lines to the persistent memory while the number of dirty lines is greater than a threshold number of dirty lines.

18. The system of claim 15:
wherein the volatile memory controller including a dirty cache line tracker cache, the dirty cache line tracker cache to store a copy of dirty cache line entries stored in the dirty cache line tracker.

19. The system of claim 18, wherein the volatile memory controller to write data directly to a persistent memory address if cache is saturated and a dirty bit corresponding to a cache line associated with the persistent memory address indicates the cache line is clean.

20. The system of claim 15, wherein the persistent memory is a byte addressable write-in-place non-volatile memory.

* * * * *